US010741144B2

(12) United States Patent
Kim et al.

(10) Patent No.: US 10,741,144 B2
(45) Date of Patent: Aug. 11, 2020

(54) DATA COMMUNICATION SYSTEM, AND DATA TRANSMISSION APPARATUS AND DATA RECEPTION APPARATUS THEREOF

(71) Applicant: SILICON WORKS CO., LTD., Daejeon-si (KR)

(72) Inventors: Myung Yu Kim, Daejeon (KR); Hyun Kyu Jeon, Daejeon (KR)

(73) Assignee: Silicon Works Co., Ltd., Daejeon-si (KR)

( * ) Notice: Subject to any disclaimer, the term of this patent is extended or adjusted under 35 U.S.C. 154(b) by 23 days.

(21) Appl. No.: 16/127,521

(22) Filed: Sep. 11, 2018

(65) Prior Publication Data

US 2019/0103070 A1 Apr. 4, 2019

(30) Foreign Application Priority Data

Sep. 29, 2017 (KR) ........................ 10-2017-0127062

(51) Int. Cl.
*G09G 5/00* (2006.01)
*H04L 12/741* (2013.01)

(52) U.S. Cl.
CPC ........... *G09G 5/008* (2013.01); *H04L 45/745* (2013.01); *G09G 2370/08* (2013.01); *G09G 2370/10* (2013.01)

(58) Field of Classification Search
CPC .............................. G09G 5/008; H01L 45/745
See application file for complete search history.

(56) References Cited

U.S. PATENT DOCUMENTS 9,215,170 B2 12/2015 Su et al.
9,860,090 B2 1/2018 Su et al.
2004/0267993 A1* 12/2004 Spencer .............. G06F 13/4286 710/110
2007/0164881 A1* 7/2007 Schwartz .............. H03M 5/145 341/50
2014/0294001 A1* 10/2014 Su ........................... H04L 45/74 370/389
2019/0260506 A1* 8/2019 Grant .................... H03M 5/145

FOREIGN PATENT DOCUMENTS

JP 2017-525227 8/2017
KR 10-2018-0016566 2/2018

* cited by examiner

*Primary Examiner* — Ariel A Balaoing
(74) *Attorney, Agent, or Firm* — Polsinelli PC

(57) ABSTRACT

Provided are a data communication system for a high speed interface and a data transmission apparatus and a data reception apparatus of the data communication system. The data communication system includes the data transmission apparatus that configures a packet including a command and a plurality of components, determines a run length of data of the packet, and performs encoding, and the data reception apparatus that decodes the data of the encoded packet.

18 Claims, 10 Drawing Sheets

DATA COMMUNICATION SYSTEM, AND DATA TRANSMISSION APPARATUS AND DATA RECEPTION APPARATUS THEREOF

BACKGROUND OF THE INVENTION

Field of the Invention

The present invention relates to a data communication system, and more particularly, to a data communication system for a high speed interface of a packet and a data transmission apparatus and a data reception apparatus of the data communication system.

Description of the Related Art

A liquid display device (LCD) panel or an organic light emitting diode (OLED) panel is mainly used for a display device for implementing a flat display.

The display device includes a timing controller, a source driver, and a display panel.

The timing controller provides display data to the source driver, wherein the source driver generates and outputs a source signal in correspondence to the data provided from the timing controller and the display panel drives a screen in correspondence to the source signal.

The display panel is developed in order to achieve a high resolution, and in order to support a high resolution of the display panel, the timing controller and the source driver need to be configured to communicate data through a high speed interface.

The timing controller and the source driver may use a protocol based on a delay locked loop (DLL) or a phase locked loop (PLL) for the purpose of a high speed interface. The DLL-based protocol may be understand to have a format in which the source driver may recover a received packet on the basis of the DLL, and the PLL-based protocol may be understand to have a format in which the source driver may recover a received packet on the basis of the PLL. As the DLL-based protocol, a clock embedded data signaling (CEDS) protocol may be exemplified. The CEDS protocol has a format in which a clock is embedded in data.

When the CEDS protocol is used, the timing controller configures and transmits a packet by combining a clock and data with each other, and the source driver receives the packet and recovers the clock and the data on the basis of the DLL. The source driver generates and outputs a source signal by using the recovered data and clock.

For a high speed interface, it is advantageous to configure a packet based on the PLL as compared with a case of configuring a packet based on the DLL.

When the timing controller and the source driver communicate with each other in the aforementioned environment, reception characteristics and clock data recovery characteristics of the source driver should be favorably guaranteed for the high speed interface.

However, when a packet is transmitted/received at a high speed, a packet including bits continuously keeping the same value may have an influence on a receiver output jitter, and each bit may not be easily recognized in a reception and clock data recovery process. For example, when a data value logically and continuously keeps "0" or "1" over several bits or more, since the receiver may not capture an exact timing of the packet and there is no change in a data value in the reception or clock data recovery process, it is difficult to exactly recognize each bit.

The aforementioned problem becomes an obstacle in a data communication system that implements a high speed interface between a data transmission apparatus and a data reception apparatus as well as the timing controller and the source driver.

In order to solve the aforementioned problem, the data communication system is required to use an improved protocol for a high speed interface between the data transmission apparatus such as the timing controller and the data reception apparatus such as the source driver.

SUMMARY OF THE INVENTION

Accordingly, the present invention has been made in an effort to solve the problems occurring in the related art, and an object of the present invention is to provide a data communication system capable of providing a protocol, which can limit a run length in which bits continuously keep the same value in data and implementing a high speed interface between a data transmission apparatus and a data reception apparatus by the protocol, the data transmission apparatus that performs encoding capable of limiting the run length by the protocol, and the data reception apparatus capable of decoding a packet to which the run length limit is applied.

Another object of the present invention is to provide a data transmission apparatus and a data reception apparatus of a data communication system capable of supporting a run length limit mode in which the number of bits continuously keeping the same value can be limited for a high speed interface.

Another object of the present invention is to provide a display system capable of implementing a high speed interface of display data by using the aforementioned protocol, and a timing controller and a source driver thereof.

A data communication system of the present invention includes a data transmission apparatus including an encoder, which configures a packet including a command and a plurality of components corresponding to display data, performs encoding for a component satisfying a run length limit condition, and outputs the packet, and an encoding control unit that determines whether each of the plurality of components satisfies the run length limit condition in which a predetermined number or more of continuous bits keep a same value, provides a run length limit code for encoding to the component satisfying the run length limit condition, and controls a change of the command to indicate the encoded component; and a data reception apparatus configured to receive the packet, check the encoded component by using the command, and decode the encoded component to original data, wherein the encoder changes the original data of the component to a run length limit code, which is able to limit a run length, by the encoding, and changes the command to indicate the encoded component.

A data reception apparatus of a data communication system of the present invention includes a decoder that receives a packet including data having a plurality of components and a command indicating encoding or non-encoding of each of the components and decodes a run length limit code of an encoded component to original data; and a decoding control unit controls, by the command, decoding of the decoder for the component of the plurality of components, which has data encoded to the run length limit code for limiting a run length of original data when the original data satisfies a run length limit condition in which a predetermined number or more of continuous bits keep a same value, and provides the decoder with the original data corresponding to the run length limit code.

According to the present invention, it is possible to perform encoding after determining whether all data included in a packet satisfies a run length limit condition, so that it is possible to prevent all the data included in the packet from having a run length satisfying a run length limit condition.

Consequently, it is possible to prevent data of a packet from being affected by a jitter in a transmission process of the packet, so that it is possible to implement a high speed interface between a data transmission apparatus and a data reception apparatus.

Furthermore, according to the present invention, the data transmission apparatus and the data reception apparatus can be set to be operable in a state suitable for one of a DLL mode, a PLL mode, and a run length limit mode by mode information, so that it is possible to provide the data transmission apparatus and the data reception apparatus having mode expandibility.

Furthermore, it is possible to provide a display system capable of implementing a high speed interface of display data by using the aforementioned protocol of the present invention, and a timing controller and a source driver thereof.

BRIEF DESCRIPTION OF THE DRAWINGS

The above objects, and other features and advantages of the present invention will become more apparent after a reading of the following detailed description taken in conjunction with the drawings, in which.

DETAILED DESCRIPTION OF PREFERRED EMBODIMENTS

Figure 1:
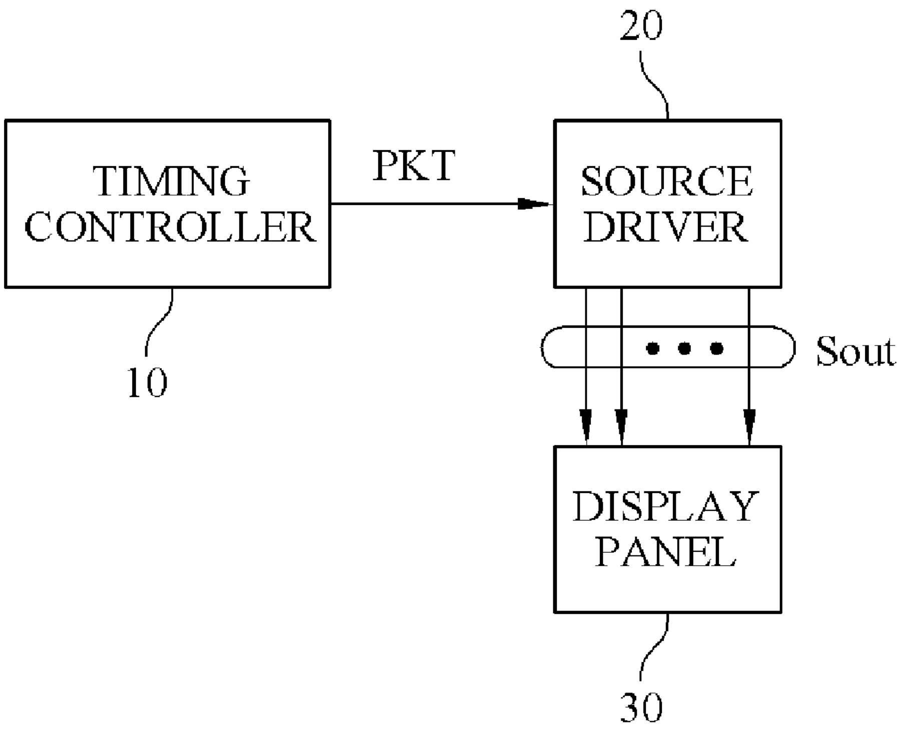
FIG. 1 is a block diagram of a display system configured as an embodiment of a data communication system of the present invention.

Reference will now be made in greater detail to a preferred embodiment of the invention, an example of which is illustrated in the accompanying drawings. Wherever possible, the same reference numerals will be used throughout the drawings and the description to refer to the same or like parts.

Since an embodiment described in the present specification and configurations illustrated in the drawings are preferred embodiments of the prevent invention and do not represent all the technical scopes of the prevent invention, there may be various equivalents and modification examples which can substitute for them at the time of application of the prevent invention.

The prevent invention discloses a data communication system that provides a protocol capable of limiting a run length in which bits continuously keep the same value in data and can implement a high speed interface between a data transmission apparatus and a data reception apparatus by the protocol defined as above.

The data communication system of the prevent invention can perform encoding capable of limiting the run length by the protocol defined as above and decode a packet to which a run length limit is applied, thereby implementing a high speed interface.

The aforementioned data communication system may be implemented as a display system that configures display data with a packet and performs packet communication. In this case, a data transmission apparatus may be included or may correspond to a timing controller, and a data reception apparatus may be included or may correspond to a source driver.

As described above, the display system exemplified as the data communication system may be configured as illustrated in FIG. 1 in order to implement a flat panel display.

Referring to FIG. 1, the display system includes a timing controller 10, a source driver 20, and a display panel 30. The display panel 30 may be configured with a liquid crystal display (LCD) panel, an organic light emitting diode (OLED) panel and the like.

The timing controller 10 is configured to receive display data provided from an exterior, generate a packet PKT corresponding to the display data, and provide the packet PKT to the source driver 20.

The source driver 20 is configured to receive the packet PKT, recover a clock and data of the packet PKT, generate a source signal Sout by using the recovered clock and data, and provide the source signal Sout to the display panel 30. One source driver 20 is illustratively shown, but various numbers of source drivers 20 may be provided according to the resolution and size of the display panel 30. The source driver 20 outputs a plurality of source signals Sout to be provided to pixels of the display panel 30 of an area in charge.

In an embodiment of the prevent invention, the packet PKT may include a command and a component for a high speed interface between the timing controller 10 and the source driver 20.

The timing controller 10 and the source driver 20 of the prevent invention are configured to be able to support a run length limit mode (hereinafter, referred to as "RLL") mode, wherein the timing controller 10 is configured to output a packet PKT of a protocol for the RLL mode.

Furthermore, the timing controller 10 and the source driver 20 may be configured to select one of the RLL mode, a PLL mode, a DLL mode by mode information to be described later.

In the RLL mode, a run length is defined as the number of bits that continuously keep the same value, an RLL is defined to limit the run length, and an RLL condition is defined as a condition defined in order to limit the run length.

The RLL mode is a mode in which data satisfying the RLL condition is encoded for transmission such that a run length is limited in the timing controller 10 and the transmitted data with the limited run length limit is decoded to original data in the source driver 20.

For the RLL mode, the timing controller 10 encodes data having a run length satisfying the RLL condition and outputs the encoded data as a packet PKT.

For the RLL mode, the source driver 20 decodes the received packet PKT to obtain original data and then performs a recovery process.

When original data is "000000", since six bits keep "0" as the same value, the run length of the original data is 6. In this case, when the RLL condition is 5, since the original data "000000" having a run length of 6 satisfies the RLL condition, the original data is encoded in the timing controller 10.

When it is assumed that a run length limit code (hereinafter, referred to as "RLL code") corresponding to the original data "000000" is "001001", the timing controller 10 encodes the original data "000000" to the RLL code "001001". Then, the timing controller 10 transmits the encoded RLL code through the packet PKT.

The source driver 20 receives the encoded data of the packet PKT, that is, the RLL code "001001" and decodes the RLL code "001001" to the original data "000000". Then, the source driver 20 performs a recovery process by using the original data.

According to the prevent invention, when the run length of original data satisfies the RLL condition as described above, the original data is encoded to the RLL code, so that it is possible to prevent data having a run length satisfying the RLL condition and including bits continuously keeping the same value from being transmitted as the packet PKT.

Consequently, according to the prevent invention, it is possible to reduce an influence of a jitter in a process in which the source driver 20 receives data of a packet, or to reduce the occurrence of an error in clock data recovery.

Figure 2:
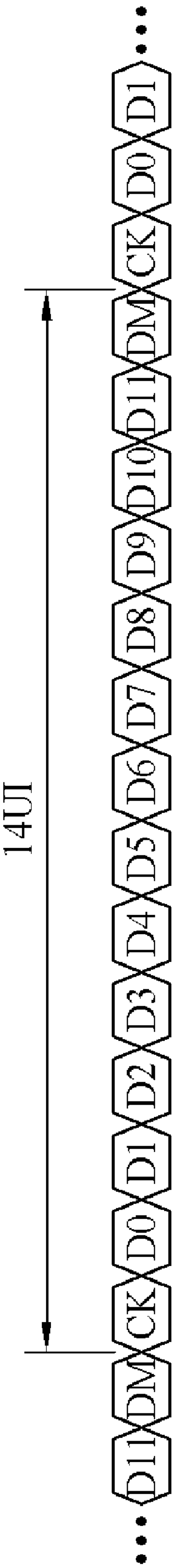
FIG. 2 is a diagram for explaining a packet structure of a DLL mode and a PLL mode.

In the case of the DLL mode or the PLL mode, a packet PKT interfaced between the timing controller 10 and the source driver 20 may be configured with a protocol as illustrated in FIG. 2.

The packet PKT of FIG. 2 may have a structure in which a clock bit CK, data D0 to D11, and a dummy bit DM are sequentially arranged in order to serially transmit data. The packet PKT of FIG. 2 includes 14 bits 14UI. The packet PKT of FIG. 2 is a DLL-based protocol in which the clock bit CK of 1 bit is embedded between the data D0 to D11 and each unit is divided by the dummy bit DM, and is available in the PLL mode.

Figure 3:
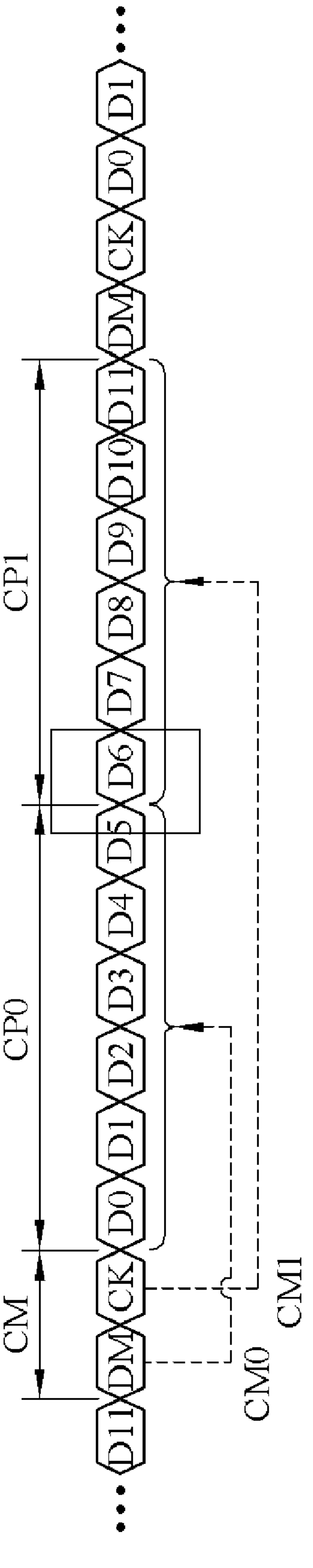
FIG. 3 is a diagram for explaining a packet structure of a run length limit mode.

However, in the RLL mode, a packet PKT for communication between the timing controller 10 and the source driver 20 includes a command and a plurality of components as illustrated in FIG. 3.

The packet PKT of FIG. 3 illustrates that each unit is configured as 14 bits as illustrated in FIG. 2. For a comparison with FIG. 2, in FIG. 3, the same reference numbers of bits constituting the packet as those of FIG. 2 are used.

In FIG. 3, the plurality of components correspond to the data D0 to D11, and the data D0 to D11 is divided into two components CP0 and CP1 in an embodiment. The two components CP0 and CP1 are obtained by dividing the bits of the sequentially connected data D0 to D11 by the same number. That is, since the data D0 to D11 is 12 bits, each of the components CP0 and CP1 is divided in units of 6 bits.

The command CM includes a plurality of indicator bits. The number of indicator bits included in the command CM may be the same number as that of components, and the plurality of components and the plurality of indicator bits may correspond to each other in a one-to-one manner.

For example, the command CM may include two indicator bits CM0 and CM1 as illustrated in FIG. 3. Between the two indicator bits CM0 and CM1, the indicator bit CM0 corresponds to the component CP0 and the indicator bit CM1 corresponds to the component CP1. Values of the indicator bits CM0 and CM1 respectively indicate encoding or non-encoding of corresponding components CP0 and CP1, and a detailed description thereof will be given later.

The packet PKT of FIG. 3 illustrates one format including a command and a plurality of components according to the prevent invention, and the packet PKT according to the prevent invention may have various formats to be described later with reference to FIG. 9 to FIG. 11.

The timing controller 10 may configure and output a packet PKT having the format of FIG. 2 or FIG. 3 by mode information to be described later, and the source driver 20 may also receive and recover the packet PKT in correspondence to the mode information to be described later.

In the RLL mode, the timing controller 10 is configured to configure a packet PKT including a command CM and a plurality of sequential components CP0 and CP1 corresponding to display data, determine whether each of the plurality of components CP0 and CP1 satisfies an RLL condition, encode a component satisfying the RLL condition, and output a packet PKT including encoded data.

The same RLL condition is applied to each of the plurality of components CP0 and CP1 and indicates a number set for the RLL. For example, when the number of bits continuously keeping the same value is limited not to be equal to or more than 5, the RLL condition may be set to 5.

Encoding of the timing controller 10 includes encoding of original data DATA_CP of a component to an RLL code DATA_RP designated in advance in correspondence to the original data DATA_CP, and a change in an indication that the command CM has been replaced with the original data DATA_CP of the component.

Figure 4:
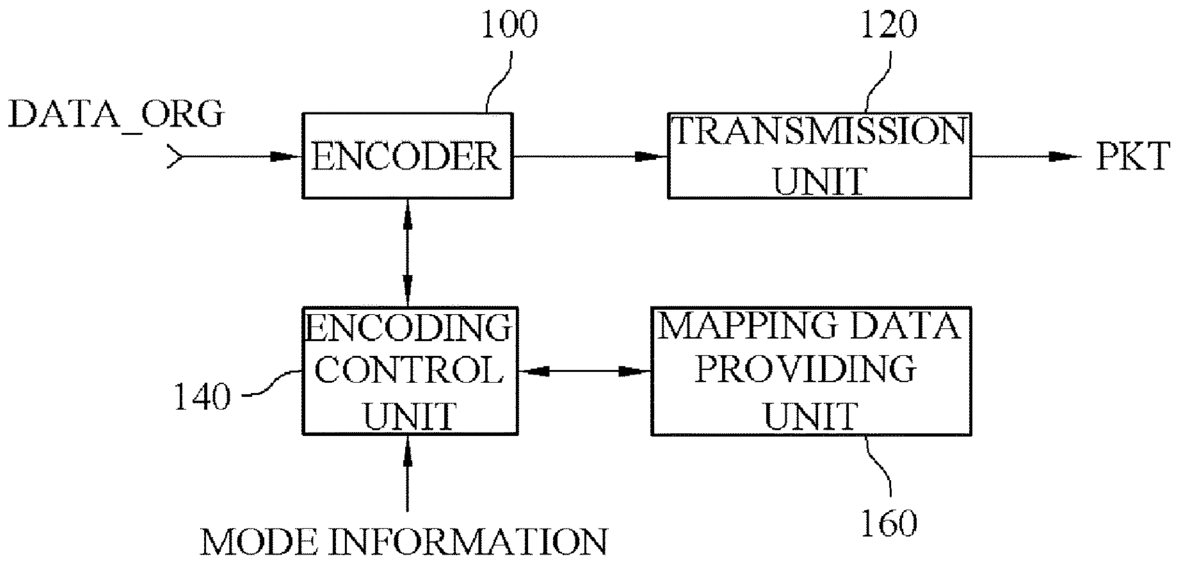
FIG. 4 is a detailed block diagram of a timing controller of FIG. 1.

For such an operation, the timing controller 10 of the prevent invention includes an encoder 100, a transmission unit 120, an encoding control unit 140, and a mapping data providing unit 160 as illustrated in FIG. 4.

In FIG. 4, the encoder 100 receives display data DATA_ORG, configures a serial packet PKT in which the command CM and the components CP0 and CP1 are arranged, encodes a component satisfying the RLL condition, and changes the command CM. The encoder 100 encodes the original data DATA_CP of the component satisfying the RLL condition to an RLL code capable of limiting a run length of the original data DATA_CP, and changes the command CM to indicate that the selected component has been encoded. The encoder 100 outputs the encoded packet PKT to the transmission unit 120.

The transmission unit 120 may include an output buffer that converts the encoded packet PKT into a differential signal and transmits the differential signal through a transmission line.

The encoding control unit 140 controls the encoding of the encoder 100. More specifically, the encoding control unit 140 checks all components included in the packet PKT configured in the encoder 100, determines whether each component satisfies the RLL condition, provides the RLL code DATA_RP corresponding to the original data DATA_CP of the component satisfying the RLL condition, and controls a change in the command CM corresponding to the component satisfying the RLL condition.

The encoding control unit 140 controls the encoder 100 to configure a packet PKT in other formats according to modes in correspondence to mode information. A first mode may be defined as the DLL mode and the PLL mode in which a packet PKT is configured as illustrated in FIG. 2, and a second may be defined as the RLL mode in which a packet PKT is configured as illustrated in FIG. 3.

In correspondence to the mode information of the first mode, the encoding control unit 140 controls the encoder 100. Accordingly, the encoder 100 configures a packet PKT as illustrated in FIG. 2 in which the clock bit CK, the data D0 to D11, and the dummy bit DM are sequentially arranged, and outputs the packet PKT through a predefined process in which encoding for the RLL is excluded. The predefined process may include a process, in which the packet PKT is configured and then additional information is inserted.

In correspondence to the mode information of the second mode, the encoding control unit 140 controls the encoder 100. Accordingly, the encoder 100 configures a packet PKT by arranging the command CM and the components CP0 and CP1 in a preset method as illustrated in FIG. 3, encodes the packet PKT, and outputs the encoded packet PKT.

The command CM may be arranged at a position corresponding to the dummy bit DM and the clock bit CK.

The RLL code for encoding may be provided in various methods. For example, the RLL code may be provided using a memory, may be provided as a digitally designed value by using an algorithm having an RLL function, or may be provided as an optimal value by digitalizing a look-up table for encoding and decoding schemes. In order to optimize the RLL code, a Kamaugh Map may be used.

The prevent invention provides a method using a memory, and the mapping data providing unit 160 may be configured using the memory.

The mapping data providing unit 160 stores a plurality of pieces of original data DATA_CP satisfying the RLL condition and RLL codes DATA_RP capable of limiting run lengths of the original data DATA_CP, and provides the encoding control unit 140 with an RLL code DATA_RP corresponding to the original data DATA_CP of a selected component according to a request of the encoding control unit 140.

Meanwhile, the source driver 20 may be configured to receive the packet PKT, check the command CM, and decode one component selected by the check to the original data DATA_CP. In correspondence to mode information to be described later, the source driver 20 may recognize and process the packet PKT as the packet based on the DLL mode and the PLL mode as illustrated in FIG. 2 or may recognize and process the packet based on the RLL mode as illustrated in FIG. 3.

Figure 5:
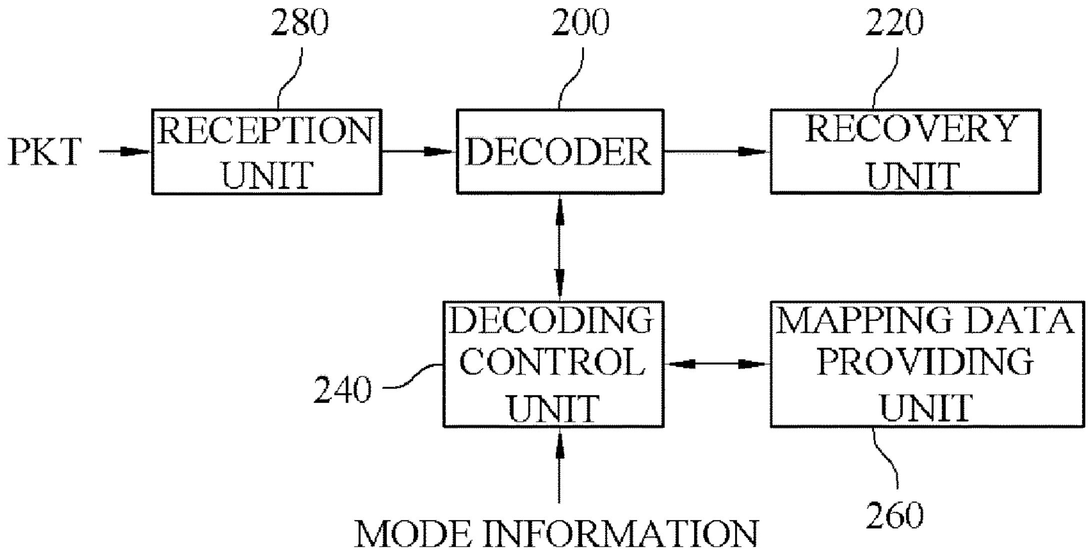
FIG. 5 is a detailed block diagram of a source driver of FIG. 1.

To this end, the source driver 20 includes a decoder 200, a recovery unit 220, a decoding control unit 240, a mapping data providing unit 260, and a reception unit 280 as illustrated in FIG. 5.

The decoder 200 receives the packet PKT through the reception unit 280, wherein the reception unit 280 may include an input buffer that receives the packet PKT transmitted as the differential signal through the transmission line.

In the RLL mode, the decoder 200 receives the packet PKT including the display data having the plurality of components CP0 and CP1 and the command CM indicating encoding or non-encoding according to each component through the reception unit 280, and decodes a component indicated by the command CM.

The packet PKT decoded by the decoder 200 is transferred to the recovery unit 220, and the recovery unit 220 performs a recovery process for recovering a clock and data from the packet PKT and generating a source signal Sout. The recovery unit 220 may output the source signal Sout generated as a result of the recovery process of the recovery unit 220 to the display panel 30.

The decoding control unit 240 checks the command CM of the decoder 200 and confirms whether the components CP0 and CP1 included in the packet PKT have an RLL code DATA_RP capable of limiting the run length of the original data DATA_CP.

As the confirmation result, when a component having the RLL code DATA_RP exists between the components CP0 and CP1, the decoding control unit 240 controls the decoding of the decoder 200. That is, the decoding control unit 240 provides the decoder 200 with the original data DATA_CP corresponding to the RLL code DATA_RP according to the component confirmed to have the RLL code DATA_RP.

Accordingly, the decoder 200 may decode the RLL code DATA_RP to the original data DATA_CP provided from the decoding control unit 240.

Meanwhile, the decoding control unit 240 may be configured to process packets PKT having different formats according to modes in correspondence to the mode information.

The decoding control unit 240 does not decode a packet PKT, in which a clock bit, data, and a dummy bit are sequentially arranged, in correspondence to the mode information of the first mode of receiving a packet of the DLL mode and the PLL mode in which the packet PKT is configured as illustrated in FIG. 2, and outputs the packet PKT to the recovery unit 220 for data recovery.

Differently from this, the decoding control unit 240 controls decoding for a packet PKT, in which the command CM and the components CP0 and CP1 are arranged in a preset method, in correspondence to the mode information of the second mode of receiving a packet of the RLL mode in which the packet PKT is configured as illustrated in FIG. 3. The decoding control unit 240 may control the operation of the decoder 200 to remove the command CM after decoding and to output data to the recovery unit 220.

The source driver 20 may be configured to receive an RLL code for decoding in various methods, similarly to the timing controller 10.

The prevent invention discloses a method using a memory and the mapping data providing unit 260 may be configured using the memory.

The mapping data providing unit 260 stores a plurality of pieces of original data DATA_CP satisfying the RLL condition and RLL codes DATA_RP corresponding to the original data DATA_CP, and provides the decoding control unit 240 with the original data DATA_CP corresponding to the RLL code DATA_RP according to a request of the decoding control unit 240.

Figure 6:
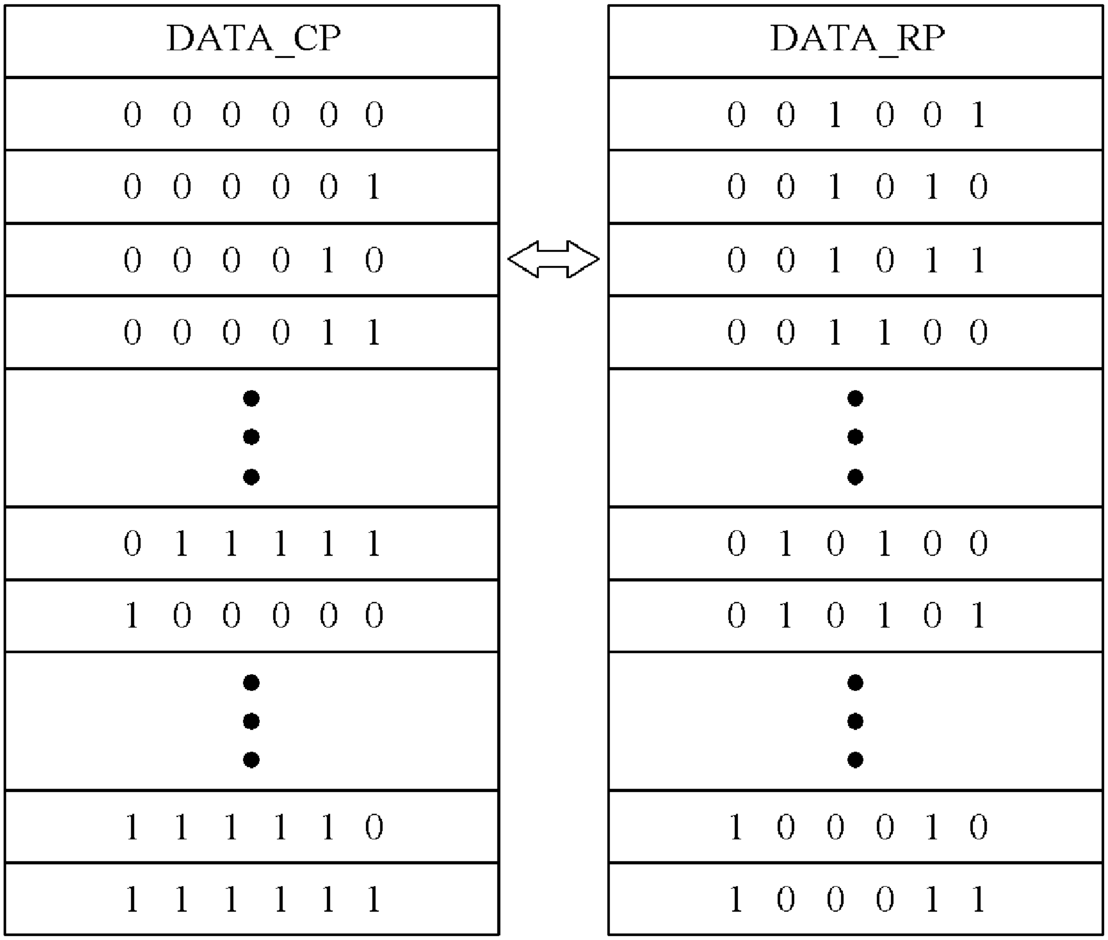
FIG. 6 is a diagram illustrating original data and a run length limit code stored in a mapping data providing unit.

The mapping data providing units 160 and 260 of FIG. 4 and FIG. 5 may be configured to manage a table in which the original data DATA_CP and the RLL code DATA_RP correspond to each other in a one-to-one manner as illustrated in FIG. 6, thereby providing the encoding control unit 140 with the RLL code DATA_RP according to a request of the encoding control unit 140 or providing the decoding control unit 240 with the original data DATA_CP according to a request of the decoding control unit 240.

The table of the mapping data providing units 160 and 260 in FIG. 6 may be set in advance by a producer and may be stored in memory devices of the timing controller 10 and the source driver 20.

The mapping data providing units 160 and 260 may have a table in which all pieces of original data DATA_CP satisfying the RLL condition according to the components CP0 and CP1 and the RLL code DATA_RP capable of limiting the run lengths of all pieces of original data DATA_CP correspond to each other in a one-to-one manner.

When each of the components CP0 and CP1 includes 6 bits, original data DATA_CP satisfying the RLL condition among 64 original data may be stored in the mapping data providing units 160 and 260. The mapping data providing units 160 and 260 may store the same number of RLL codes DATA_RP as that of the original data DATA_CP satisfying the RLL condition, wherein the original data DATA_CP and the RLL code DATA_RP are set to correspond to each other in a one-to-one manner.

For example, "000000" may be stored in the mapping data providing units 160 and 260 as one of the original data DATA_CP satisfying the RLL condition, and "001001" may be stored in the mapping data providing units 160 and 260 as the RLL code DATA_RP so as to correspond to "000000" (the original data DATA_CP) in a one-to-one manner.

Figure 7:
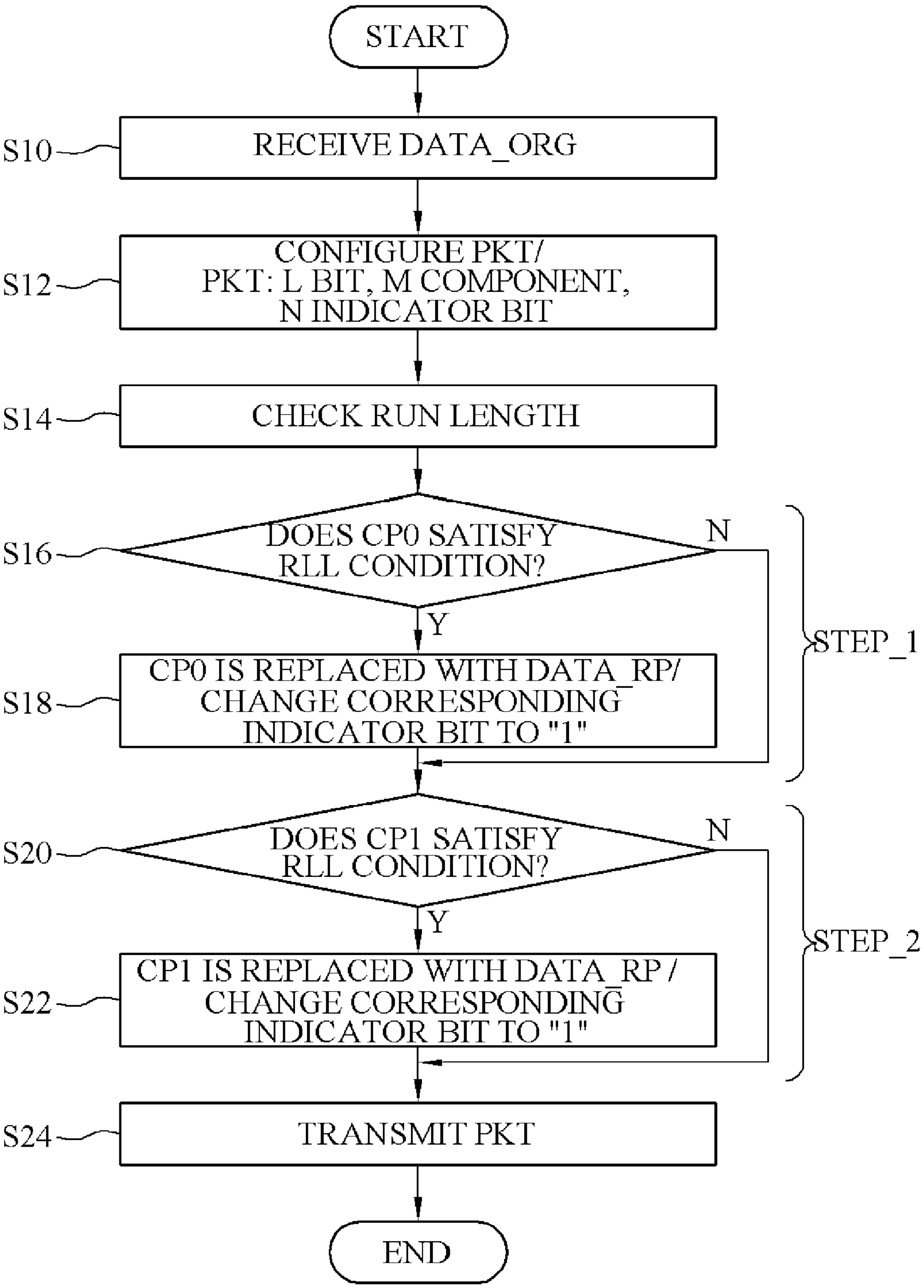
FIG. 7 is a diagram for explaining encoding of a timing controller.

The display system is configured as described above, so that the timing controller 10 of the prevent invention may encode a component of a packet PKT satisfying the RLL condition in an order as illustrated in FIG. 7.

That is, the timing controller 10 receives display data DATA_ORG from an exterior (S10), and the received display data DATA_ORG is configured as a packet PKT by the encoder 100 (S12).

In the RLL mode, the timing controller 10 configures the packet PKT by the protocol as illustrated in FIG. 3. In this case, the packet PKT may be configured to include M components having L bits and N indicator bits. In an embodiment of the prevent invention, the packet PKT of FIG. 3 is configured to include two (M=2) components CP0 and CP1 each having six (L=6) bits and two (N=2) indicator bits CM0 and CM1. The two indicator bits CM0 and CM1 express one command CM. In this case, the packet PKT may have a structure in which the command CM, the component CP0, and the component CP1 are sequentially arranged.

When the encoder 100 configures the components CP0 and CP1 as above, the encoding control unit 140 checks run lengths for the components CP0 and CP (S14).

In order to describe an encoding process to be described later, the component CP0 has "000000" as original data DATA_CP, and the component CP1 has "000001" as original data DATA_CP. The RLL condition is assumed that a run length is equal to or more than 5. The initial value of each of the indicator bits CM0 and CM1 of the command CM may be designated as "0". The indicator bit CM0 is a bit for instructing encoding or non-encoding of the component CP0 and the indicator bit CM1 is a bit for instructing encoding or non-encoding of the component CP1.

The encoding control unit 140 firstly controls encoding STEP_1 for the component CP0.

That is, the encoding control unit 140 determines whether "000000", which is the original data DATA_CP of the component CP0, satisfies the RLL condition (S16).

In order to determine whether the component CP0 satisfies the RLL condition, the encoding control unit 140 checks bits by a connection of some bits positioned before and after the component CP0 as well as bits of the component CP0.

That is, the encoding control unit 140 determines whether the indicator bits CM0 and CM1 of the command CM, the bits of the component CP0, and some bits subsequent to the component CP0 satisfy the RLL condition. The encoding control unit 140 determines whether "1" or "0" are continuously kept more than 5 bits with respect to all corresponding bits.

Since the run length of "000000", which is the original data DATA_CP of the current component CP0, is 6 even though a boundary area of the component CP0 is not considered, "000000" satisfies the RLL condition.

When it is determined that the RLL condition is satisfied inclusive of the boundary area of the component CP0 and the component CP0, the encoding control unit 140 encodes the original data DATA_CP of the component CP0 to the RLL code DATA_RP capable of limiting a run length of the original data DATA_CP, and controls the encoder 100 such that the indicator bit CM0 indicating the encoding state of the component CP0 is changed to "1" (S18).

In this case, the encoding control unit 140 may receive "001001", which is the RLL code DATA_RP capable of limiting a run length of the original data DATA_CP, from the mapping data providing unit 160, and provide "001001" to the encoder 100.

When the component CP0 is replaced with the RLL code DATA_RP "001001", the component CP0 does not satisfy the RLL condition.

As a consequence, the command CM is set to "10" and the component CP0 is encoded to "001001".

As described above, when the encoding STPE_1 for the component CP0 is ended or the original data DATA_CP of the component CP0 does not satisfy the RLL condition, the encoding control unit 140 performs encoding STPE_2 for the component CP1.

That is, the encoding control unit 140 determines whether "000001", which is the original data DATA_CP of the component CP1, satisfies the RLL condition (S20).

In order to determine whether the component CP1 satisfies the RLL condition, the encoding control unit 140 determines whether some bits positioned before or after the component CP1, connected bits of bits of the component CP1, and the bits of the component CP1 satisfy the RLL condition.

Some bits positioned before the component CP1 may indicate some bits continuously having the same value "0" or "1" at the rear of the component CP0, and some bits positioned after the component CP1 may indicate indicator bits CM0 and CM1 included in a command CM of another packet subsequent to the component CP1 or a part of a component.

That is, the encoding control unit 140 determines whether the component CP1 itself and the boundary area of the component CP1 satisfy the RLL condition.

Since the run length of "000001", which is the original data DATA_CP of the current component CP1, is 5 even though the boundary area is not considered, "000001" satisfies the RLL condition.

When it is determined that the RLL condition is satisfied inclusive of the component CP1 and the boundary area, the encoding control unit 140 encodes the original data DATA_CP of the component CP1 to the RLL code DATA_RP capable of limiting a run length of the original data DATA_CP, and controls the encoder 100 such that the indicator bit CM1 indicating the encoding state of the component CP1 is changed to "1" (S22).

In this case, the encoding control unit 140 may receive "001010", which is the RLL code DATA_RP capable of limiting the original data DATA_CP, from the mapping data providing unit 160, and provide "001010" to the encoder 100.

When the component CP1 is replaced with the RLL code DATA_RP "001010", the component CP1 and the boundary area of the component CP1 do not satisfy the RLL condition.

As a consequence, the command CM is set to "11" and the component CP1 is encoded to "001010".

As described above, when the encoding STPE_2 for the component CP1 is ended, the packet PKT defined by the command CM, the component CP0, and the component CP1 is encoded to "11001001001010" and the encoder 100 transmits the encoded packet PKT (S24).

As described above, the timing controller 10 may encode the command CM and the components CP0 and CP1 in the RLL mode, and provide the encoded packet PKT to the source driver 20.

Figure 8:
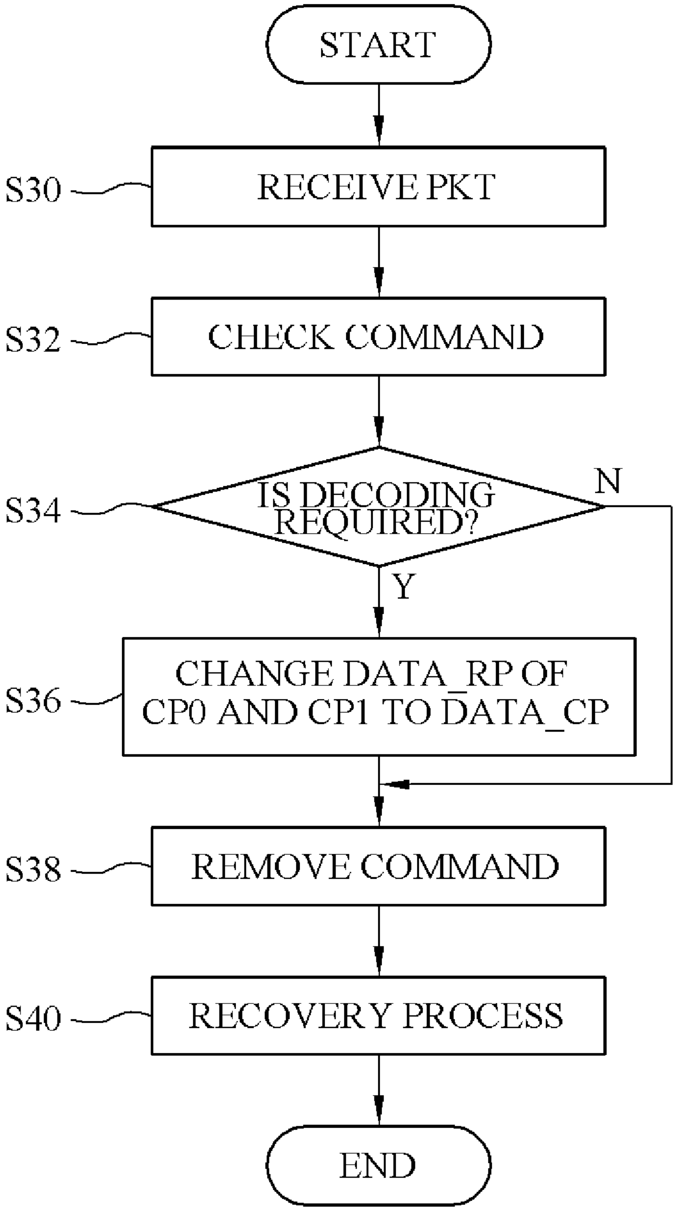
FIG. 8 is a diagram for explaining decoding of a source driver.

Meanwhile, the source driver 20 of the prevent invention may perform decoding in an order as illustrated in FIG. 8.

The source driver 20 receives the packet PKT transmitted from the timing controller 10 (S30). The received packet PKT is "11001001001010". The received packet PKT is transferred to the decoder 200 via the reception unit 280.

In the RLL mode, the decoding control unit 240 of the source driver 20 checks the command CM of the packet PKT received in the decoder 200 (S32).

Referring to FIG. 7, the command CM of the received packet PKT is "11" and thus the indicator bits CM0 and CM1 have a value set to "1". This indicates that the component CP0 indicated by the indicator bit CM0 has been encoded and the component CP1 indicated by the indicator bit CM1 has also been encoded.

The decoding control unit 240 determines the values of the indicator bits CM0 and CM1 of the command CM and determines whether decoding for the components CP0 and CP1 is required (S34).

Since the current command CM has the value set to "11", the decoding for all the components CP0 and CP1 is required.

Accordingly, the decoding control unit 240 receives the original data DATA_CP corresponding to the RLL code DATA_RP of the component CP0 and the original data DATA_CP corresponding to the RLL code DATA_RP of the component CP1 from the mapping data providing unit 260, and controls decoding of the decoder 200 (S36).

That is, the decoder 200 changes the RLL code DATA_RP of the component CP0 to "000000" which is the original data DATA_CP, and changes the RLL code DATA_RP of the component CP1 to "000001" which is the original data DATA_CP.

When the command CM of the packet is "00", the decoder 200 determines that no decoding is required in step S34. In this case, the source driver 20 does not perform step S36 for the packet PKT.

The decoder 200 removes the command CM from the packet PKT decoded in step S36 or the packet PKT determined that no decoding is required in step S34 (S38).

The decoder 200 removes the command CM, and then provides the recovery unit 220 with the components CP0 and CP1 corresponding to the display data DATA_ORG (S38).

The recovery unit 220 may perform a data recovery process to recover a clock and data (S40).

The source driver 20 may generate and output a source signal Sout by using the clock and the data recovered in the recovery unit 220 as described above.

As described above, according to the prevent invention, it is possible to configure all data included in a packet with a plurality of components, to determine whether each component satisfies the RLL condition, and to perform encoding.

A packet PKT of the RLL mode for an embodiment the prevent invention may be variously configured differently from the configuration in which the indicator bits CM0 and CM1 constituting the command CM and the components CP0 and CP1 are sequentially aligned as illustrated in FIG. 3.

Figure 9:
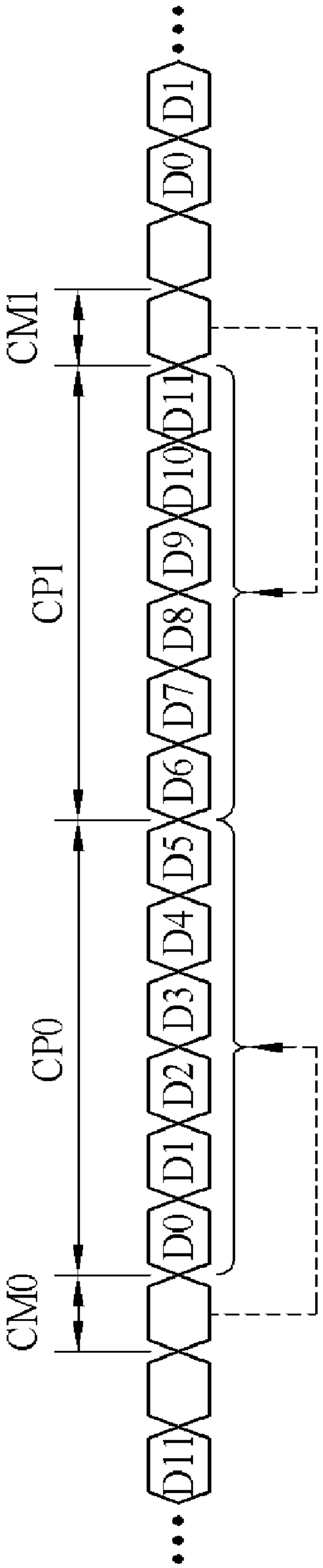
FIG. 9 is a diagram illustrating another example of a packet for a run length limit code.

For example, a packet PKT may be configured such that the indicator bit CM0, the component CP0, the component CP1, and the indicator bit CM1 may be aligned in this order as illustrated in FIG. 9. In this case, the indicator bit CM0 corresponds to the clock bit CK of FIG. 2 and indicates encoding or non-encoding of the component CP0, and the indicator bit CM1 corresponds to the dummy bit DM of FIG. 2 and indicates encoding or non-encoding of the component CP1.

Figure 10:
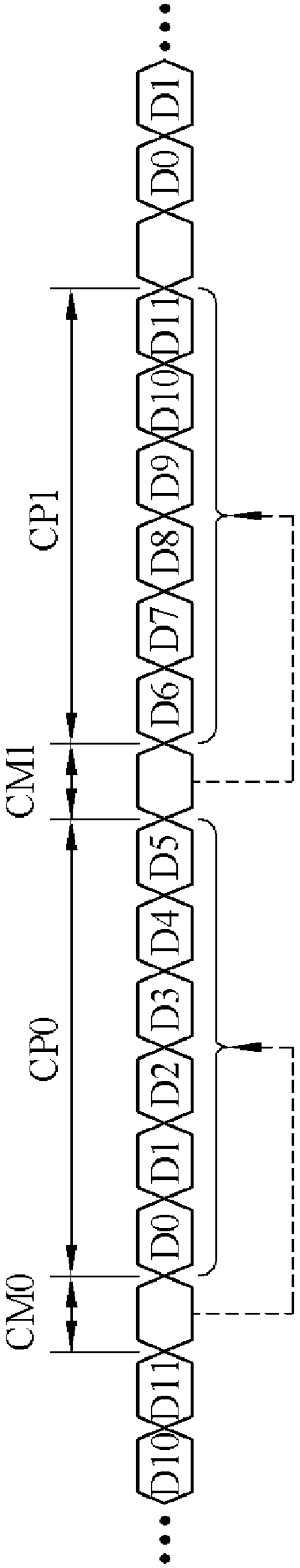
FIG. 10 and FIG. 11 are diagrams illustrating further another example of a packet for a run length limit code.

Furthermore, a packet PKT may be configured such that the indicator bit CM0, the component CP0, the indicator bit CM1, and the component CP1 may be aligned in this order as illustrated in FIG. 10.

Figure 11:
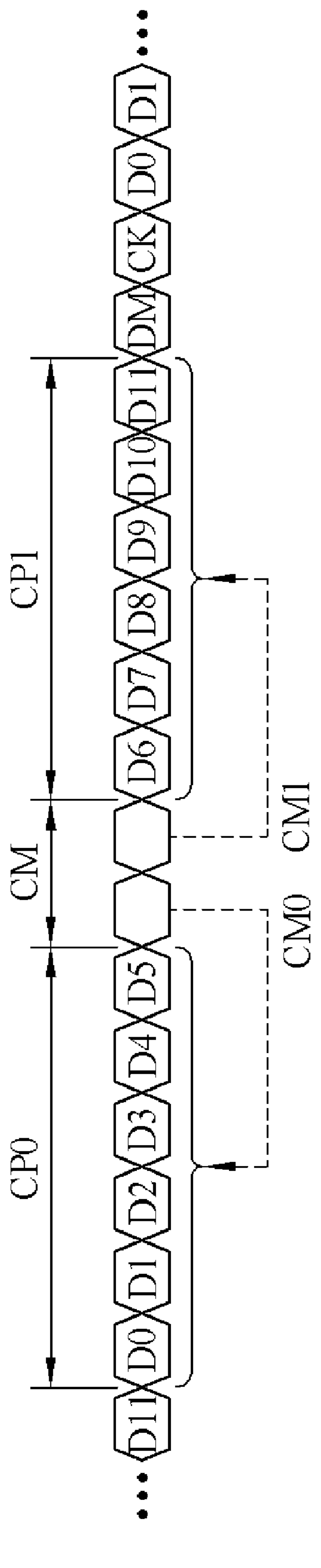

Furthermore, a packet PKT may be configured such that the component CP0, the indicator bits CM0 and CM1 constituting the command CM, and the component CP1 may be aligned in this order as illustrated in FIG. 11.

Also in FIG. 10 and FIG. 11, it can be understood that the indicator bit CM0 indicates encoding or non-encoding of the component CP0, and the indicator bit CM1 indicates encoding or non-encoding of the component CP1.

As described above, according to the prevent invention, it is possible to configure a packet by checking whether all data satisfies the RLL condition, to prevent data of the packet from being affected by a jitter and the like in a transmission process, and to exactly recognize a data value in a reception or clock data recovery process.

Consequently, the prevent invention has an advantage that it is possible to implement a high speed interface between a timing controller (a data transmission apparatus) and a source driver (a data reception apparatus).

Furthermore, according to the prevent invention, the timing controller (the data transmission apparatus) and the source driver (the data reception apparatus) can be set to be operable in a state suitable for one of the DLL mode, the PLL mode, and the RLL mode, so that it is possible to provide a data communication system having mode expandibility.

Although a preferred embodiment of the present invention has been described for illustrative purposes, those skilled in the art will appreciate that various modifications, additions and substitutions are possible, without departing from the scope and the spirit of the invention as disclosed in the accompanying claims.

What is claimed is:

1. A data communication system comprising:

a data transmission apparatus including an encoder, which configures a packet including a command and a plurality of components corresponding to display data, performs encoding for a component satisfying a run length limit condition, and outputs the packet, and an encoding control unit that determines whether each of the plurality of components satisfies the run length limit condition in which a predetermined number or more of continuous bits keep a same value and controls to change the component satisfying the run length limit condition to a run length limit code for encoding and to change the command to indicate the encoded component; and a data reception apparatus configured to receive the packet, check the encoded component by using the command, and change the encoded component to original data, wherein the encoder changes the original data of the component to a run length limit code, which is able to limit a run length, by the encoding, and changes the command to indicate the encoded component.

2. The data communication system according to claim 1, wherein in the data transmission apparatus, a number of indicator bits included in the command is equal to a number of the components, and the components and indicator bits correspond to each other in a one-to-one manner.

3. The data communication system according to claim 1, wherein the encoder configures the packet to include the command, a first component, and a second component, performs first encoding for changing first original data of the first component to a first run length limit code for limiting a run length when the continuous bits, which are connected with at least one of bits positioned before or after the first component and some bits of the first component, and the bits of the first component satisfy the run length limit condition, performs second encoding for changing second original data of the second component to a second run length limit code for limiting a run length when the continuous bits, which are connected with at least one of bit positioned before or after the second component and some bits of the second component, and the bits of the second component satisfy the run length limit condition, and changes at least one of the indicator bits of the command for indicating the component encoded in correspondence to the first encoding and the second encoding.

4. The data communication system according to claim 1, wherein the data reception apparatus removes the command after the decoding and performs a data recovery process.

5. The data communication system according to claim 1, wherein the data transmission apparatus and the data reception apparatus are included in a display system, the data transmission apparatus is configured as a timing controller of the display system and configures the packet including the command and the plurality of sequential components corresponding to the display data, and the data reception apparatus is configured as a source driver, decodes the packet in correspondence to the command, and generates a source signal corresponding to the plurality of components.

6. The data communication system according to claim 1, wherein the data transmission apparatus further comprises:

a mapping data providing unit configured to provide the run length limit code, wherein the mapping data providing unit includes at least one of a memory that stores the run length limit code corresponding to the original data, an algorithm that provides the run length limit code as a digitally designed value in correspondence to the original data, and a look-up table that provides the run length limit code as a digitally designed value.

7. The data communication system according to claim 1, wherein the encoder configures the packet including the command, a first component, and a second component, the first component and the second component have a same number of bits, the command includes a first indicator bit and a second indicator bit, the first indicator bit has a value indicating encoding or non-encoding of the first component, and the second indicator bit has a value indicating encoding or non-encoding of the second component.

8. The data communication system according to claim 1, wherein the encoding control unit controls the encoder to configure the packet in a different format according to a mode in correspondence to mode information, configures the packet including a clock bit, data, and a dummy bit in correspondence to the mode information of a first mode so as to output the packet through a predefined process excluding the encoding, configures the packet including the command and the components in correspondence to the mode information of a second mode and encodes the packet so as to output the packet, and the command corresponds to the dummy bit and the clock bit.

9. The data communication system according to claim 1, wherein the command includes a plurality of indicator bits that have a preset initial value, and have a changed value to indicate the encoded component when the run length limit condition is satisfied.

10. The data communication system according to claim 1, wherein the encoder configures the packet in sequence of first and second indicator bits included in the command, a first component, and a second component.

11. The data communication system according to claim 1, wherein the encoder configures the packet in sequence of a first indicator bit included in the command, a first component, a second component, and a second indicator bit included in the command.

12. The data communication system according to claim 1, wherein the encoder configures the packet in sequence of a first indicator bit included in the command, a first component, a second indicator bit included in the command, and a second component.

13. The data communication system according to claim 1, wherein the encoder configures the packet in sequence of a first component, first and second indicator bits included in the command, and a second component.

14. A data reception apparatus comprising:

a decoder configured to receive a packet including data having a plurality of components and a command indicating an encoded component and to change a run length limit code of the encoded component to original data; and a decoding control unit configured to check, by the command, the encoded component, which has the run length limit code for limiting a run length of original data when the original data satisfies a run length limit condition in which a predetermined number or more of continuous bits keep a same value, and to provide the decoder with the original data corresponding to the run length limit code.

15. The data reception apparatus according to claim 14, wherein the decoder receives a packet including the command, a first component, and a second component, the first component and the second component have a same number of bits, the command includes a first indicator bit and a second indicator bit, the first indicator bit has a value indicating encoding or non-encoding of the first component, and the second indicator bit has a value indicating encoding or non-encoding of the second component.

16. The data reception apparatus according to claim 14, wherein the decoding control unit determines a format of the packet in correspondence to mode information, controls decoding of the decoder to be excluded for the packet including a clock bit, data, and a dummy bit in correspondence to the mode information of a first mode, and controls the decoding of the decoder to be performed for the packet including the command and the components in correspondence to the mode information of a second mode.

17. The data reception apparatus according to claim 14, further comprising:

a mapping data providing unit configured to provide the original data, wherein the mapping data providing unit includes at least one of a memory that stores the original data corresponding to the run length limit code, an algorithm that provides the original data as a digitally designed value in correspondence to the run length limit code, and a look-up table that provides the original data as a digitally designed value.

18. The data reception apparatus according to claim 14, wherein the decoder and the decoding control unit are included in a source driver of a display system, and the decoder receives the packet corresponding to display data.

* * * * *